United States Patent
He et al.

(10) Patent No.: US 10,372,761 B2
(45) Date of Patent: Aug. 6, 2019

(54) AUTO-DISCOVERY OF DATA LINEAGE IN LARGE COMPUTER SYSTEMS

(71) Applicant: SAP SE, Walldorf (DE)

(72) Inventors: Min He, San Jose, CA (US); Nikhil Patil, Sunnyvale, CA (US); Jun Lu, Cupertino, CA (US)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 15/392,932

(22) Filed: Dec. 28, 2016

(65) Prior Publication Data
US 2018/0181630 A1    Jun. 28, 2018

(51) Int. Cl.
G06F 16/00    (2019.01)
*G06F 16/901*    (2019.01)
*G06F 16/23*    (2019.01)
*G06F 16/215*    (2019.01)

(52) U.S. Cl.
CPC ........ *G06F 16/9024* (2019.01); *G06F 16/215* (2019.01); *G06F 16/2365* (2019.01)

(58) Field of Classification Search
CPC ......... G06F 17/30371; G06F 17/30563; G06F 17/30; G06F 9/5038; G06F 17/30286; G06F 17/30595; G06F 17/30283; G06F 17/30477; G06F 17/30575; G06F 17/30545; G06F 17/30377; G06F 17/3053; G06F 16/9024; G06F 16/215; G06F 16/2365; G06F 16/00; G06Q 10/10; H04L 67/1025
See application file for complete search history.

(56) References Cited

U.S. PATENT DOCUMENTS

| | | | | |
|---|---|---|---|---|
| 2004/0220956 | A1* | 11/2004 | Dillon | G06F 17/3056 707/E17.005 |
| 2009/0276692 | A1* | 11/2009 | Rosner | G06F 17/30498 715/227 |
| 2010/0017503 | A1* | 1/2010 | Kim | G06F 8/71 709/219 |
| 2010/0024163 | A1* | 2/2010 | Collene | E05D 7/12 16/233 |
| 2012/0304307 | A1* | 11/2012 | Ramesh | G06Q 10/06 726/28 |
| 2014/0143263 | A1* | 5/2014 | Ritter | G06F 16/215 707/756 |
| 2014/0172908 | A1* | 6/2014 | Konik | G06F 16/951 707/769 |

(Continued)

*Primary Examiner* — Anh Ly
(74) *Attorney, Agent, or Firm* — Schwegman Lundberg & Woessner, P.A.

(57) ABSTRACT

In an example, one or more processes that transform data originating in one or more of a plurality of different data sources are identified. Then, for each of the identified one or more processes, a relationship table is created, the relationship table listing objects input to the process, objects output from the process, and one or more mappings defining transformations performed on the objects input to the process to produce the objects output from the process. Dependencies are created between relationship tables by linking at least an instance of a first object input to a process in a first relationship table with at least an instance of the first object output from a process in a second relationship table. Lineage of an object in the computer system is traced by accessing one or more of the relationship tables and the dependencies.

20 Claims, 10 Drawing Sheets

(56) References Cited

U.S. PATENT DOCUMENTS

| | | | | |
|---|---|---|---|---|
| 2014/0278838 A1* | 9/2014 | Novak | G07B 15/063 | 705/13 |
| 2014/0279979 A1* | 9/2014 | Yost | G06F 17/30994 | 707/695 |
| 2015/0058278 A1* | 2/2015 | Fankhauser | G06F 17/30563 | 707/602 |
| 2015/0142836 A1* | 5/2015 | Borges | G06F 17/30569 | 707/756 |
| 2015/0161235 A1* | 6/2015 | Libfeld | G06F 16/252 | 707/607 |
| 2015/0249725 A1* | 9/2015 | Hurst | H04L 67/1095 | 709/203 |
| 2015/0347936 A1* | 12/2015 | Duan | G06F 16/212 | 705/7.27 |
| 2016/0188685 A1* | 6/2016 | Janarthanam | G06F 17/30867 | 707/602 |
| 2018/0104781 A1* | 4/2018 | Yasuda | B23Q 7/04 | |

\* cited by examiner

US 10,372,761 B2

AUTO-DISCOVERY OF DATA LINEAGE IN LARGE COMPUTER SYSTEMS

TECHNICAL FIELD

This document generally relates to systems and methods for computer software. More specifically, this document relates to automatic discovery of data lineage in large computer systems.

BACKGROUND

Large computer systems can gather and analyze data generated from a large number of different sources. Extremely large data sets may be analyzed computationally to reveal patterns, tends, and associations. Such large data sets are often referred to as "big data." Big data tools can analyze high-volume, high-velocity, and high-variety information assets far better than conventional tools and relational databases that struggle to capture, manage, and process big data within a tolerable elapsed time and at an acceptable total cost of ownership.

In large computer systems, there are often many steps, from where data is generated to where data is consumed, which are typically accomplished by various computing tools that handle data movement and transformation so that all the data becomes consumable when they reach a final big data analytics tool.

The source of data, and also the reliability and trustworthiness of the source, can affect how the data is analyzed. Data from less reliable sources may still be useful, but must be carefully handled, especially in combination with data from more reliable sources. It is difficult, if not impossible, however, to determine the reliability and trustworthiness of data when the source of the data cannot be determined. It would be useful to be able to identify where data comes from and how that data has been moved and transformed. In other words, it would be useful to trace data lineage from end-to-end so that data quality problems can be determined and addressed.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
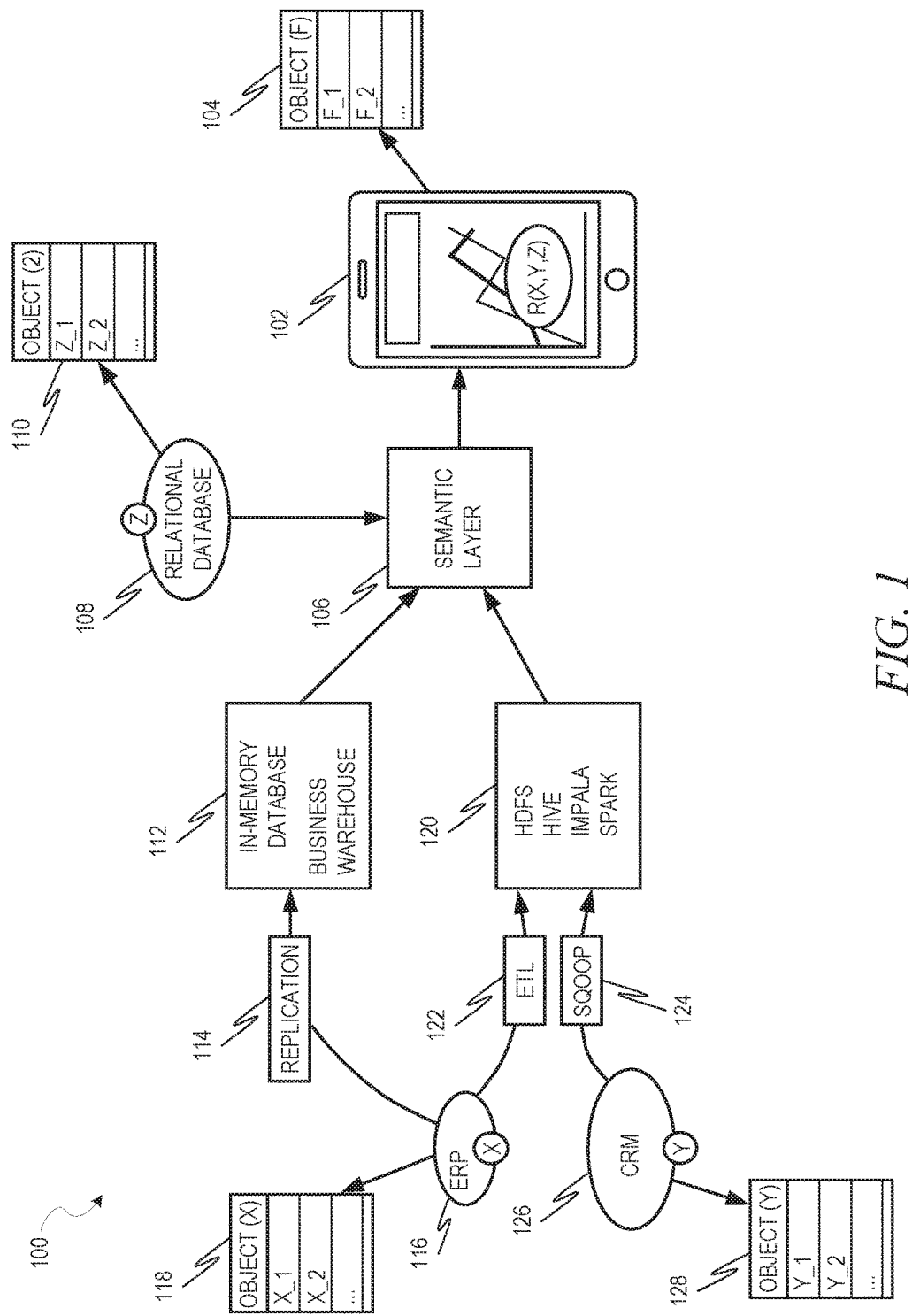
FIG. 1 is a block diagram illustrating a system for big data analysis of data from multiple disparate data sources in accordance with an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, data lineage of big data is tracked using relationships tables that are processed and built and then utilized to trace the data lineage by chaining the relationship tables. This allows the system to answer the question, "How much can I trust this data?" i.e. whether this data is coming from a reliable source. A source is reliable as per the quality score for each system/relationship table.

Data lineage may be defined as a data lifecycle that includes the data's origins and where it moves over time. It describes what happens to data as it passes through diverse processes. This helps provide visibility into the analytics pipeline.

In order to construct the lineage/data flow of a particular object, such as a table, column, view or report, metadata may be collected from remote sources (e.g., input sources other than the host on which an Information Steward (IS, a data governance tool from, for example, SAP SE of Walldorf, Germany) is running). A select number of objects may be collected from these remote sources, and the objects to be collected may vary as per the type of the remote source. For example, the data elements/objects (such as tables, columns, and views) collected from relational databases may not be the same as the objects (such as files, CSV file fields, and Hive tables) collected from a Hadoop stack, although some objects may be the same type and have the same data.

Information is collected from the remote sources and stored in relationship tables in the IS repository. The objects may be hierarchical in nature (e.g., file systems, schema-table-column). When an extraction/integrator task is executed, the relationship table is populated. Each row in this table denotes a source-target relationship for two data elements in respective data source. The extraction task may be run for all user configured/scheduled remote sources.

Assuming that all the metadata has been extracted from multiple sources, a relationship engine then traces the data lineage from these source-target relations for a given data element.

Thus, suppose a user wants to find out whether information in a business intelligence system report is coming from reliable sources. The user may make use of the data lineage functionality now built into the IS. For example, the user may have configured and run integrators of types described below, which have run and collected metadata and data elements of each data source to populate a relationship table. The integrator types may be as follows:

Relational Database: 'Global Sales' database that has information on global sales of 'Product A' including tables 'Central US Sales', 'Western US Sales', 'Eastern US Sales'.

Hadoop Data source: Archived files 'Central US Sales.csv', 'Western US Sales.csv', 'Eastern US Sales.csv' for the respective relational database tables 'Central US Sales', 'Western US Sales', 'Eastern US Sales'. Also, these files are then loaded into 'US Sales' Hive table.

Data Services, a ETL tool from SAP SE of Walldorf, Germany: Job to transfer the data from Hive table 'US Sales' to 'Sales' table in HANA Database.

HANA Database: 'Sales' table.

SAP BI: Report 'US Sales Report'

Taking the Hadoop integrator for example, during the task run, the source and target elements may be identified by either obtaining the metadata associated with the element or by accessing the data in the data element itself. As an example, if the files 'Central US Sales.csv', 'Western US Sales.csv', 'Eastern US Sales.csv' are archived in the Hadoop file system and also the data of these files was loaded into Hive table 'US Sales', the source target relationship {x→y} is as follows:

| Source Object (Input x) | Target Object (Output y) | Source Target Relationship (f) |
|---|---|---|
| x1 - File 'Central US Sales.csv' | Table 'US Sales' | x1 -> y |
| x2 - File 'Western US Sales.csv' | Table 'US Sales' | x1 -> y |
| x3 - File 'Eastern US Sales.csv' | Table 'US Sales' | x1 -> y |

Similarly the file fields, i.e., each header element in the CSV files 'Central US Sales.csv', 'Western US Sales.csv', 'Eastern US Sales.csv', is mapped to a column in the Hive table 'US Sales' since the data is loaded and appended directly from files to the Hive table. Below is the source target relationship or mapping {y=f(x)}:

| Source Object (Input x) | Target Object (Output y) | Source Target Mapping (f) |
|---|---|---|
| x1 - File Field 'Sales_ID' | Column 'Sales_ID' in Hive table 'US Sales' | y = x1 |
| x2 - File Field 'Total_Revenue' | Column 'Total_Revenue' in Hive table 'US Sales' | y = x2 |
| x3 - File Filed 'Count_Sold' | Column 'Count_Sold' in Hive table 'US Sales' | y = x3 |

As described earlier, each data element may have associated metadata that can be used by the integrator. The user can search for different metadata elements from different sources and create mappings or user defined relationships, in addition to those object relationships already collected automatically during the integrator task run. These mappings are also shown in the impact/lineage of that element. For example, the CUSTOMER_ID column from the CUSTOMER table in ERP can be mapped to the CUST_ID column of the SALES table in a HANA database, which will then also be shown in the impact/lineage of either data elements or the impact/lineage of other related data elements.

FIG. 1 is a block diagram illustrating a system 100 for big data analysis of data from multiple disparate data sources in accordance with an example embodiment. Here, the system 100 includes a big data analytics tool 102, such as, for example, SAP Lumira from SAP SE of Walldorf, Germany. The goal of the big data analytics tool 102 is to generate a business intelligence report 104 containing final data (here referred to as final data F, with individual pieces of final data F being named F_1, F_2, and so on).

The big data analytics tool 102 interfaces with semantic layer 106 to gather data from multiple disparate data sources. Notably, this may include many different layers of data sources as well. For example, one data source may be a relational database 108, in which relational data 110 is directly stored without transformation. However, another data source may be an in-memory database 112, such as the HANA in-memory database from SAP SE of Walldorf, Germany, which may store data that has been transformed via a replication process 114 from an enterprise resource planning (ERP) component 116 which had access to original data 118. Likewise, yet another data source may be a distributed file system (DFS) 120, such as Hadoop Distributed File System (HDFS), Hive, Impala, or Spark, which may store data that has been transformed via an extract, transform, load (ETL) process 122 from ERP component 116 and/or data that has been transformed via a Sqoop process 124 from a customer relationship management (CRM) component 126, which obtained it from original data 128. Sqoop is a tool designed for efficiently transferring bulk data between Hadoop and structured datastores such as relational databases.

It should be noted that an in-memory database may be defined as a database in which data is persisted in main or system memory of a computer system (i.e., memory that was traditionally volatile). This is in contrast to databases that employ a disk-based storage mechanism.

It should also be noted that the term "transform" as used in this disclosure shall be interpreted broadly to include the movement of data from one location to another, even without changing the underlying data itself.

In FIG. 1, the big data analytics tool 102 is analyzing data from relational data 110, original data 118, and original data 128, all of which may differ in their reliability. Additionally, multiple transformations (i.e., processes 114, 122, 124) have occurred, each of which may have introduced their own unreliability into the data. Indeed, in one instance, original data 118 was actually transformed in two different ways (processes 114 and 122), thus it appears to be from two different sources even though the original data 118 is the same.

Figure 2:
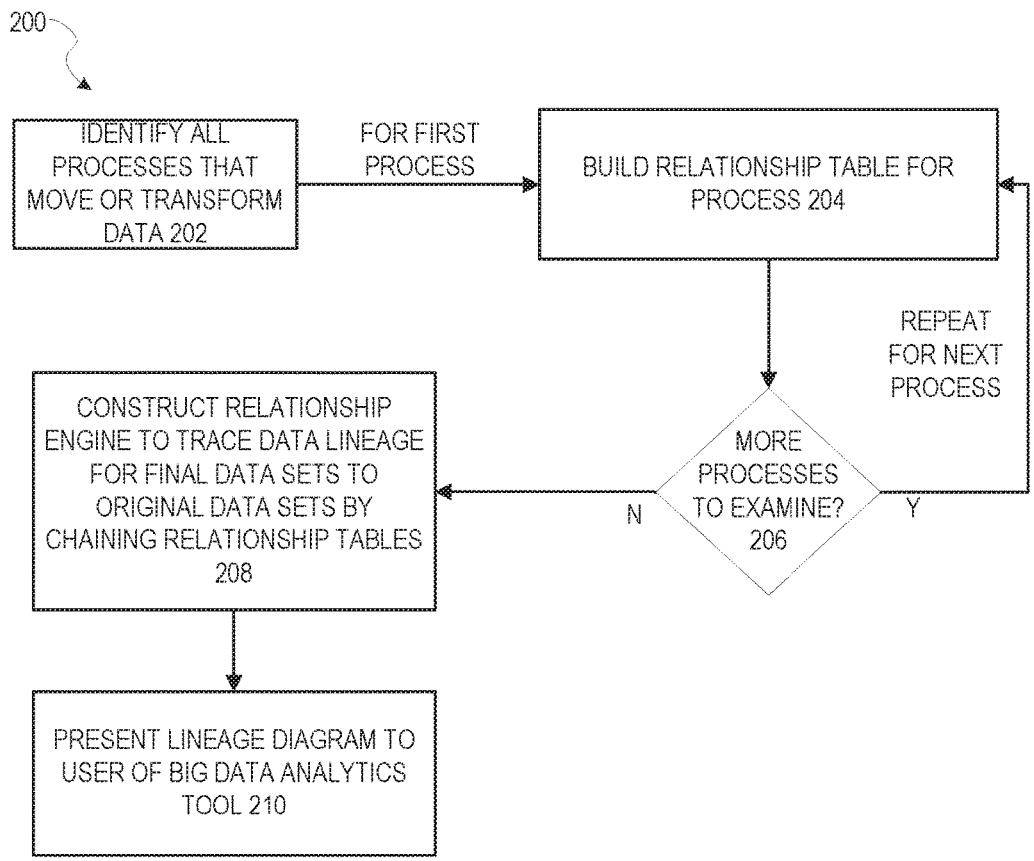
FIG. 2 is a flow diagram illustrating a method, in accordance with an example embodiment, of automatically discovering data lineage in a large computer system.
Figure 3:
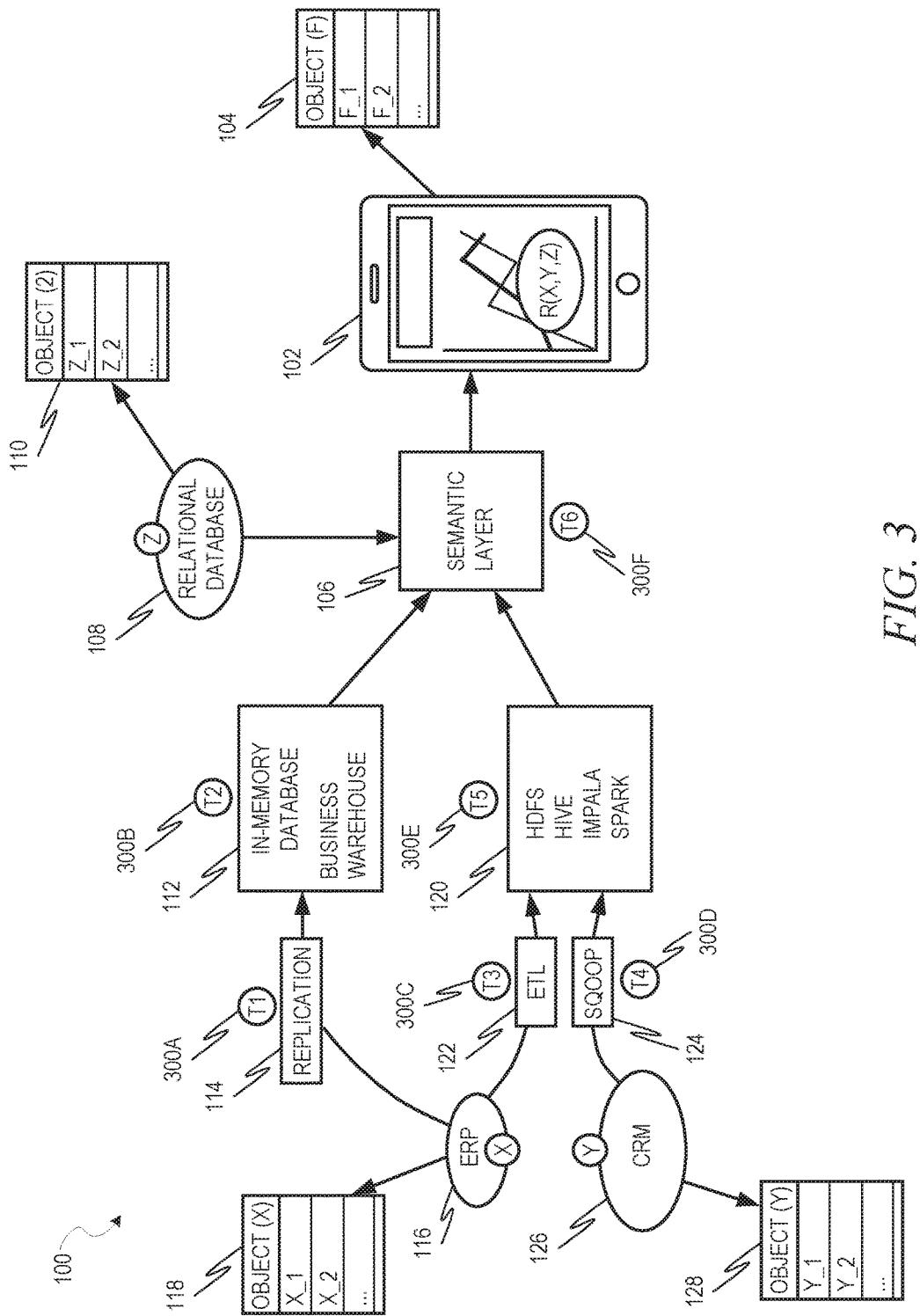
FIG. 3 is a block diagram illustrating the system of FIG. 1 after a subsequent operation has been performed.

FIG. 2 is a flow diagram illustrating a method 200, in accordance with an example embodiment, of automatically discovering data lineage in a large computer system. At operation 202, all processes that transform data are identified. FIG. 3 is a block diagram illustrating system 100 after operation 202 has been performed. As can be seen, six processes T1-T6 300A-300F have been identified.

Referring back to FIG. 2, a loop is then begun for each of the processes. At operation 204, a relationship table is built for the process. There are actually multiple types of relationships that can be tracked. The first is relationships between objects in one application or process. For example, CRM component 126 may have a number of different objects representing different types of data, but some of these objects may have relationships with others As an example, a CRM record for a particular user may have an indication of contact information for a number of different business contacts for the user, each of which may be represented by their own CRM records. There is therefore a relationship between the user's CRM record and the business contacts' CRM records. In its initial stage, the relationship table captures this first type of relationship.

At operation 206, it is determined if there are any other processes to examine. If so, then the method 200 loops back to operation 204 for the next process. If not, then the method 200 proceeds to operation 208.

Figure 4:
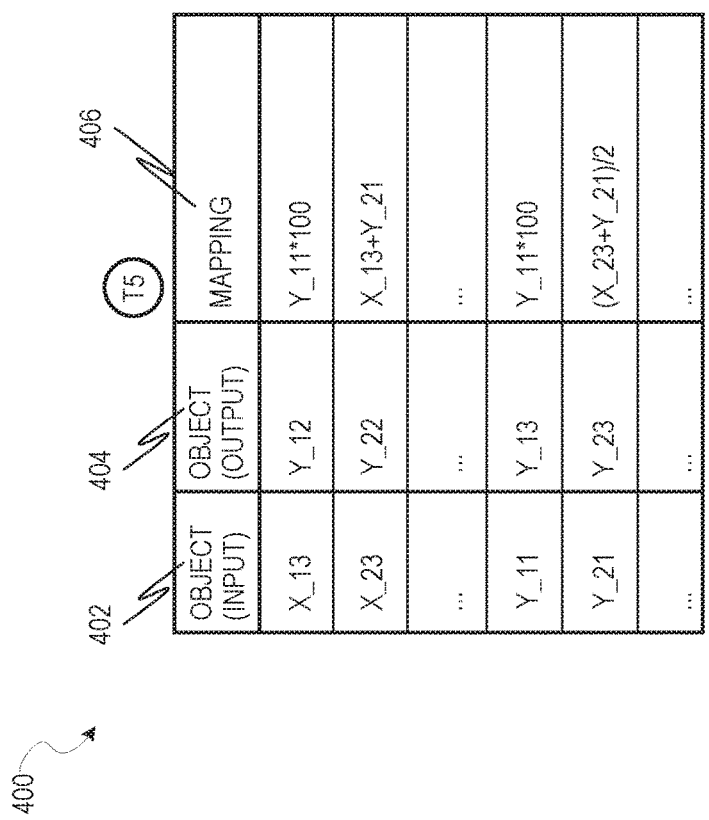
FIG. 4 is a diagram illustrating an example of a relationship table in accordance with an example embodiment.

FIG. 4 is a diagram illustrating an example of a relationship table 400 in accordance with an example embodiment. In this example, relationship table 400 corresponds to DFS 120, and the scripts executed by DFS 120 to perform transformation of data. The relationship table 400 includes an identification of input objects 402, which includes objects from both original data 118 and original data 128, output objects 404, and one or more mappings 406. The input objects 402 may be a vector of objects that serve as an input to one or more processes executed by scripts in the DFS 120. In this manner, the row that each object is presented in the relationship table 400 is not indicative of anything. On the other hand, the output objects 404 relate to the one or more mappings 406 in that, for each row, the output object 404 is the result of the corresponding mapping 406 listed on that row. Each mapping 406 is a transformation of some sort. Thus, for example, in this relationship table 400, output object Y_12 is formed by transforming input object Y_11 by multiplying it by one hundred, as indicated in the mapping Y_11*100.

Figure 5:
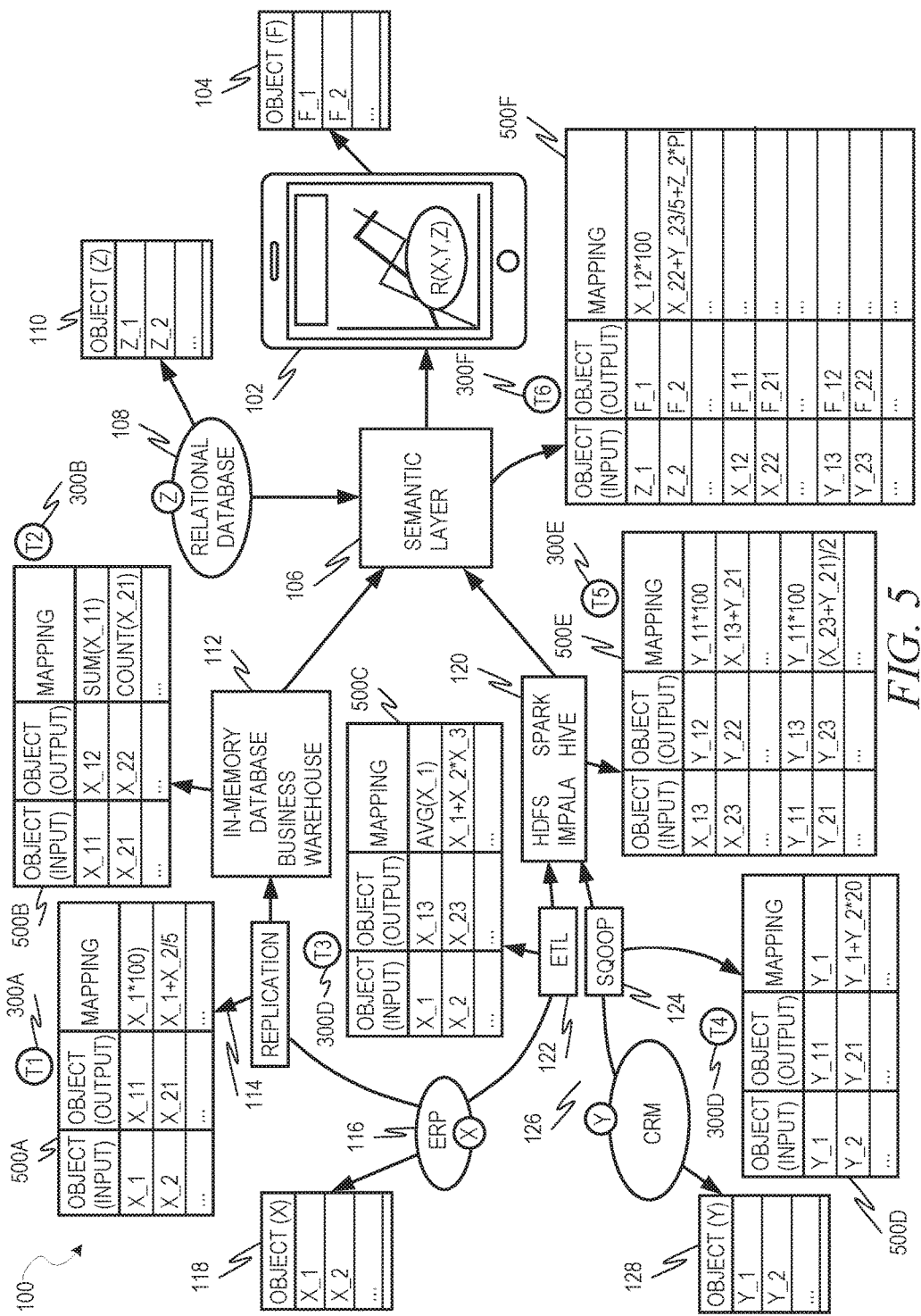
FIG. 5 is a block diagram illustrating the system of FIG. 1 after a subsequent operation has been performed.

FIG. 5 is a block diagram illustrating system 100 after operation 206 has been performed for each process. As can be seen, each of the processes T1-T6 300A-300F now have corresponding relationship tables 500A-500F.

Referring back to FIG. 2, at operation 208 a relationship engine is constructed to trace the data lineage from final data sets to original data sets by chaining the relationship tables. This chaining involves identifying a second type of relationship, namely relationships among objects between processes. This is performed by creating a dependency between every object specified in a mapping in a relationship table and an identical object specified in the output of another relationship table (or specified in original data).

Figure 6:
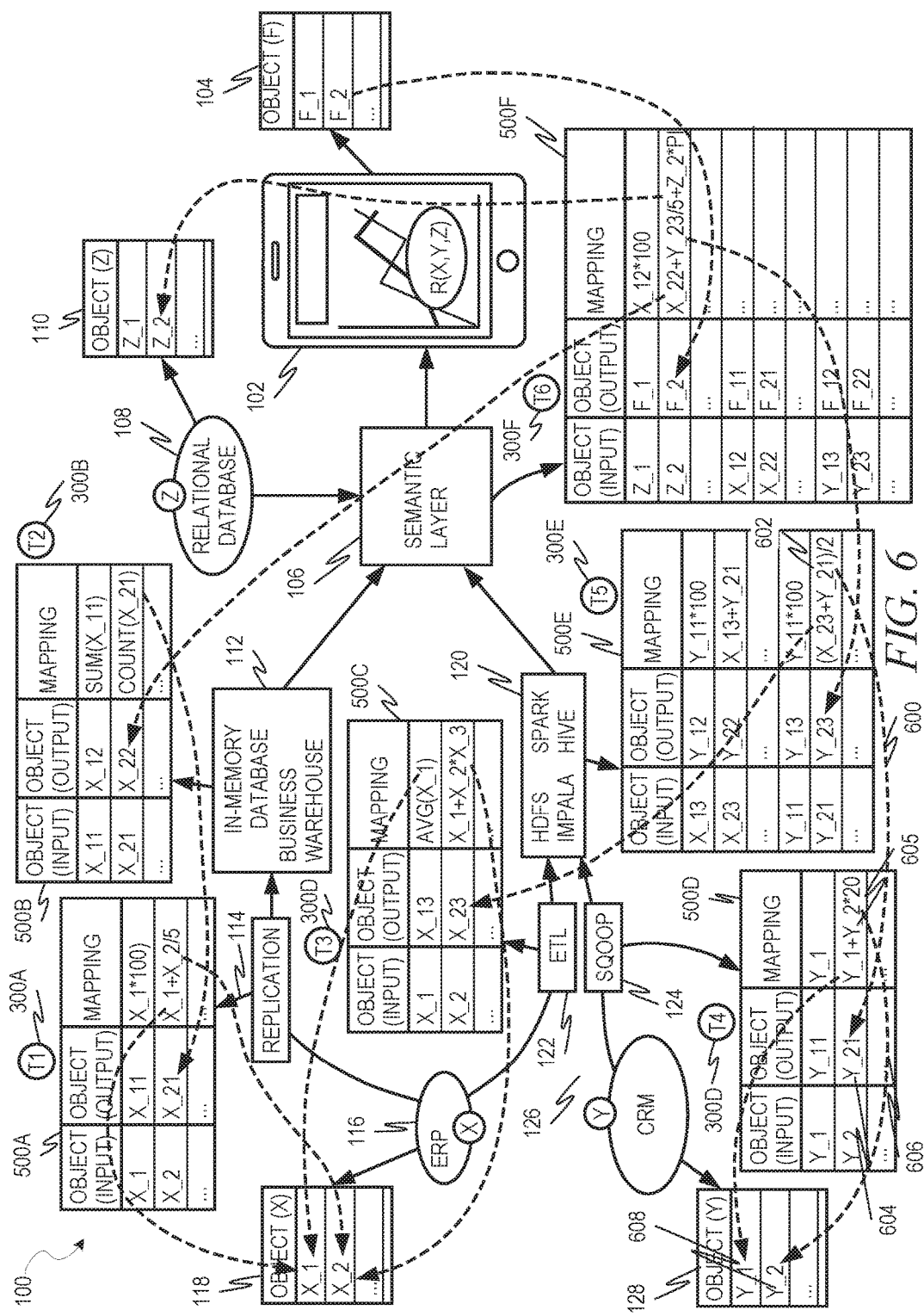
FIG. 6 is a block diagram illustrating the system of FIG. 1 after a subsequent operation has been performed.

FIG. 6 is a block diagram illustrating system 100 after operation 208 has been performed. Dependencies are signified by dashed lines. Dependency 600, for example, has been established between mapping 602 in relationship table 500E and output object 604 in relationship table 500D. This is because mapping 602 performs a transformation using output object 604, specifically mapping 602 maps (X_23+Y_21)/2 to Y_23, and object 604 is Y_21.

Dependency 606, for example, has been established between mapping 605 in relationship table 500D and object 608 in original data 128. This is because mapping 605 performs a transformation using object 608, specifically mapping 605 maps Y_1+Y_2*20 to Y_21, and object 608 is Y_2.

Figure 7:
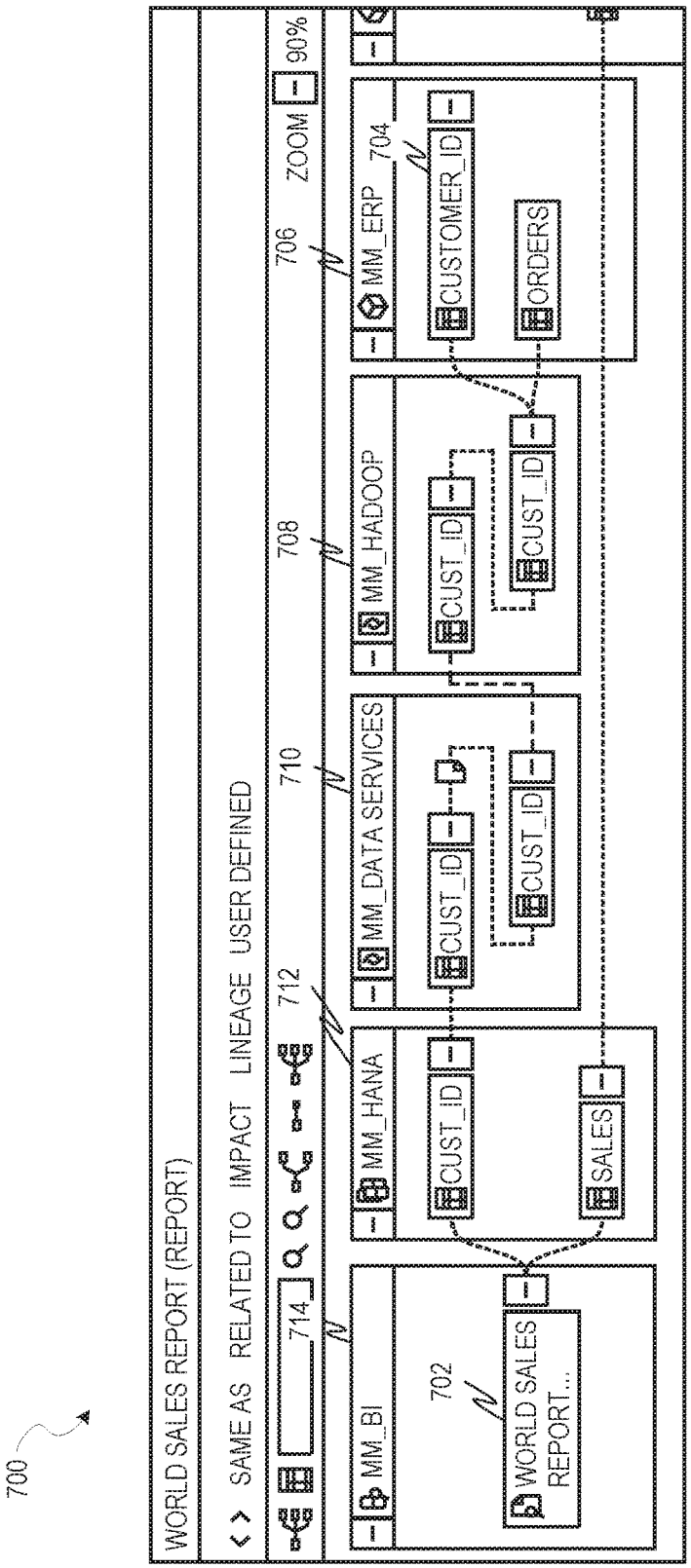
FIG. 7 is a screen capture illustrating a lineage diagram in accordance with an example embodiment.

The combination of the relationship tables and the dependencies may then be utilized to trace lineage of data. This lineage may be utilized in a number of different ways in large computer systems. Referring back to FIG. 2, in one example embodiment, at operation 210 a lineage diagram may be presented to a user of the big data analytics tool 102. FIG. 7 is a screen capture illustrating a lineage diagram 700 in accordance with an example embodiment. The lineage diagram 700 presents the dependencies between a final object 702 and the original source 704 of a piece of data. As can be seen in this example, the data has passed through a number of processes/applications, beginning with an ERP 706, then Hadoop 708, then Data Services 710, then a HANA database 712, and finally into a business intelligence component 714 where a report (final object 702) is generated based on the data. The lineage diagram 700 allows the user to see the entire lineage of the data, including which processes/applications transformed the data as well as the identification of the data at each process/application. For example, the data was titled "CUSTOMER_ID" at the ERP 706 while titled CUST_ID at the Data Services 710.

In another example embodiment, a quality score for each data element may be computed. The most common question asked by users after taking a look at the impact/lineage diagram is how reliable is a particular data source. As such, in an example embodiment the system can compute a quality score on the respective data source and display it on the diagram.

In order to calculate this score, a set of rules is defined by the user which further define the scale and a reference by which the data score is of good quality and in turn is reliable. These rules are then run (i.e., rule validation task) on the data source and determine the quality score based on the number of rows that failed the set of rules.

Hence, the score is calculated as follows:

$$f(g(x))=Q_{sc}$$

Where g=function that defines the set of rules on column(s) of data elements
x=Column(s) on which the rules are defined
g(x)=failed rows since the respective column cells do not satisfy the rule conditions
f=function that calculates the quality score $Q_{sc}$ Rule validation example:
1. In the above example, 'US Sales' table must contain the sales from country 'USA' only. Hence, the column 'Country' should only contain 'USA'. $Country is each row value of column 'Country'.

$$g(Country)=\$Country\ IN\ ('USA')$$

2. Similarly in a global sales database, the user can specify which country's sales figures should be available in the 'Sales' table. Hence, user can choose a range of values for column 'Country'. $Country is each row value of column 'Country'.

$$g(Country)=\$Country\ IN\ ('CAN','TTA','ARG',\\ 'VEN','MEX','ESP','BRA','FRA','USA')$$

3. For more complex computations, such as to set rules on the SSN of the 'Customers' table, the user can decide the formats of SSN that are supposed to be in the table. Also the user can combine different SSN formats of different countries. $Country is each row value of column 'Country'.

```
g(SSN) = function($Country, $SSN) {
    IF ($Country ='USA')
        THEN IF (match_pattern ($SSN, '999-99-9999')) RETURN
        TRUE;
        ELSE RETURN FALSE;
    ELSE IF ($Country='CAN')
        THEN IF (match_pattern ($SSN, '999-999-999')) RETURN
        TRUE;
        ELSE RETURN FALSE;
ELSE RETURN FALSE;
}
```

As an example, the most basic way to calculate the quality score is as follows:

$$f(g(SSN))=(1-(number\ of\ failed\ rows\ number\ of\\ total\ rows))*10$$

This score has lowest 0 i.e. least reliable and maximum 10 i.e most reliable. The threshold for reliability can be configured by the user or can be calculated through complex machine learning algorithms.

Figure 8:
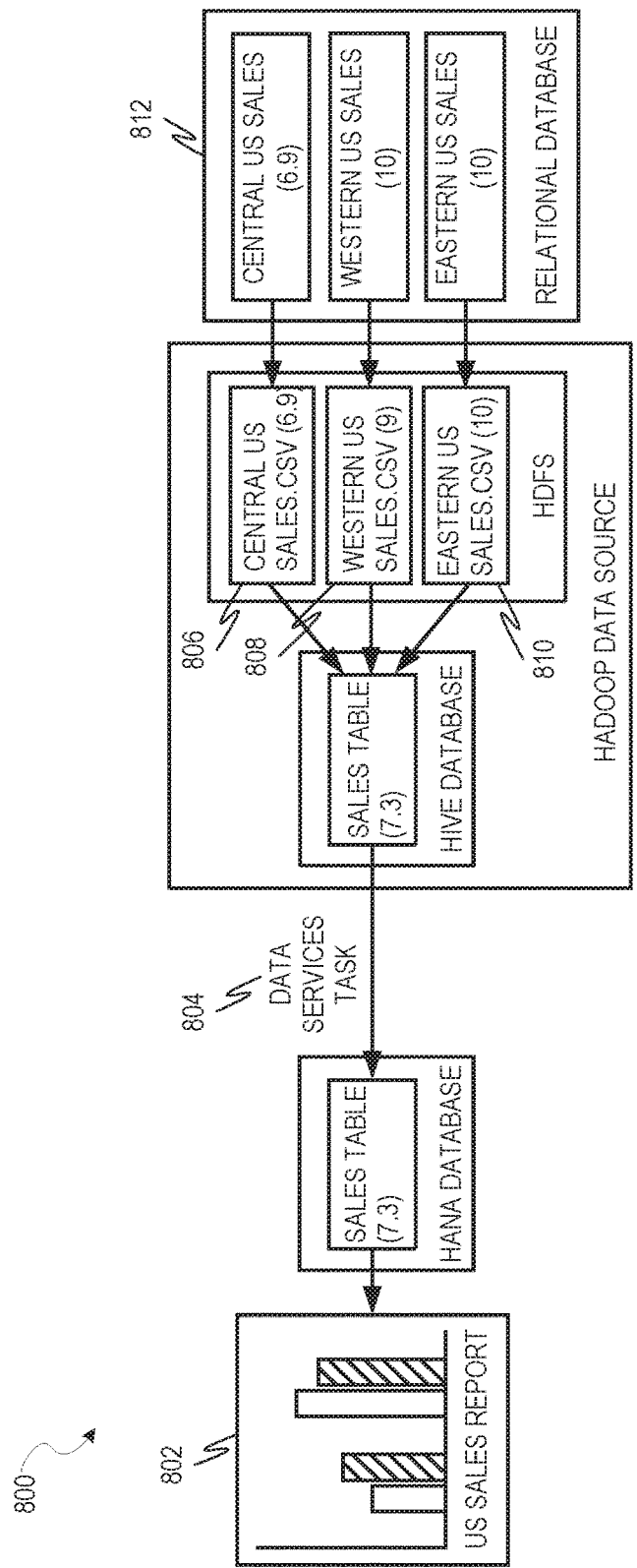
FIG. 8 is a block diagram illustrating a system in which a quality score is assigned to each data element in accordance with an example embodiment.

FIG. 8 is a block diagram illustrating a system 800 in which a quality score is assigned to each data element in accordance with an example embodiment. Here, for example, sales table 802 is assigned a score of 7.3, both before and after a Data Services task 804 is executed on it, while data used to create the sales table 802, such as Central US Sales.csv 806, Western US Sales.csv 808, and Eastern US Sales.csv 810, have their own quality scores. Indeed, the data used to create sales table 802 can be traced all the way back to relational database 812, with corresponding quality scores assigned to individual pieces of data.

EXAMPLES

Example 1

A system comprising:
at least one processor;
a memory; and
an Information Steward component stored in the memory and executable by the at least one processor, the Information Steward comprising:
  one or more integrators to perform operations comprising:
    identifying, in a computer system comprising a plurality of different data sources and a plurality of different applications performing operations on data from the plurality of different data sources, one or more processes that transform data originating in one or more of the plurality of different data sources;
    for each of the identified one or more processes, creating a relationship table, the relationship table listing objects input to the process, objects output from the process, and one or more mappings defining transformations performed on the objects input to the process to produce the objects output from the process;
  a relationships engine to perform operations comprising:
    creating one or more dependencies between relationship tables by linking at least an instance of a first object in input to a process in a first relationship table with at least an instance of the first object in output from a process in a second relationship table; and
  a big data analytics engine to perform operations comprising:
    tracing lineage of an object in the computer system by accessing one or more of the relationship tables and the one or more dependencies between the relationship tables.

Example 2

The system of Example 1, wherein the big data analytics engine is further to perform operations comprising:
  calculating a quality score for a data element, the quality score indicating how reliable a data source producing the data element is.

Example 3

The system of Examples 1 or 2, wherein the big data analytics engine further performs operations comprising generating, in a graphical user interface, a lineage diagram visually indicating the traced lineage of the object in the computer system.

Example 4

The system of Example 3, wherein the lineage diagram indicates an identification of the object in each of a plurality of different applications that transformed the object.

Example 5

The system of any of Examples 1-4, wherein the different data sources include at least an Enterprise Resource Planning component and an in-memory database.

Example 6

The system of any of Examples 1-5, wherein each relationship table contains a first column for input objects, a second column for output objects, and a third column for mappings.

Example 7

The system of Example 6, wherein for each row of a relationship table, a mapping in the third column corresponds to a transformation that produces an object in the second column, but does not correlate with the object in the first column.

Example 8

A computerized method comprising:
  identifying, in a computer system comprising a plurality of different data sources and a plurality of different applications performing operations on data from the plurality of different data sources, one or more processes that transform data originating in one or more of the plurality of different data sources;
  for each of the identified one or more processes, creating a relationship table, the relationship table listing objects input to the process, objects output from the process, and one or more mappings defining transformations performed on the objects input to the process to produce the objects output from the process;
  creating one or more dependencies between relationship tables by linking at least an instance of a first object in input to a process in a first relationship table with at least an instance of the first object in output from a process in a second relationship table; and
  tracing lineage of an object in the computer system by accessing one or more of the relationship tables and the one or more dependencies between relationship tables.

Example 9

The method of Example 8, further comprising calculating a quality score for a data element, the quality score indicating how reliable a data source producing the data element is.

Example 10

The method of Examples 8-9, further comprising generating, in a graphical user interface, a lineage diagram visually indicating the traced lineage of the object in the computer system.

Example 11

The method of Example 10, wherein the lineage diagram indicates an identification of the object in each of a plurality of different applications that transformed the object.

Example 12

The method of any of Examples 8-11 wherein the different data sources include at least an Enterprise Resource Planning component and an in-memory database.

Example 13

The method of any of Examples 8-12, wherein each relationship table contains a first column for input objects, a second column for output objects, and a third column for mappings.

Example 14

The method of Example 13, wherein for each row of a relationship table, a mapping in the third column corresponds to a transformation that produces an object in the second column, but does not correlate with the object in the first column.

Example 15

A non-transitory machine-readable storage medium comprising instructions, which when implemented by one or more machines, cause the one or more machines to perform operations comprising:
  identifying, in a computer system comprising a plurality of different data sources and a plurality of different applications performing operations on data from the plurality of different data sources, one or more processes that transform data originating in one or more of the plurality of different data sources;
  for each of the identified one or more processes, creating a relationship table, the relationship table listing objects input to the process, objects output from the process, and one or more mappings defining transformations performed on the objects input to the process to produce the objects output from the process;
  creating one or more dependencies between relationship tables by linking at least an instance of a first object in input to a process in a first relationship table with at least an instance of the first object in output from a process in a second relationship table; and
  tracing lineage of an object in the computer system by accessing one or more of the relationship tables and the one or more dependencies between relationship tables.

Example 16

The non-transitory machine-readable storage medium of Example 15, wherein the operations further comprise calculating a quality score for a data element, the quality score indicating how reliable a data source producing the data element is.

Example 17

The non-transitory machine-readable storage medium of Examples 15 or 16, wherein the operations further comprise generating, in a graphical user interface, a lineage diagram visually indicating the traced lineage of the object in the computer system.

Example 18

The non-transitory machine-readable storage medium of Example 17, wherein the lineage diagram indicates an identification of the object in each of a plurality of different applications that transformed the object.

Example 19

The non-transitory machine-readable storage medium of any of Examples 15-18, wherein the different data sources include at least an Enterprise Resource Planning component and an in-memory database.

Example 20

The non-transitory machine-readable storage medium of any of Examples 15-19, wherein each relationship table contains a first column for input objects, a second column for output objects, and a third column for mappings.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internee of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 9:
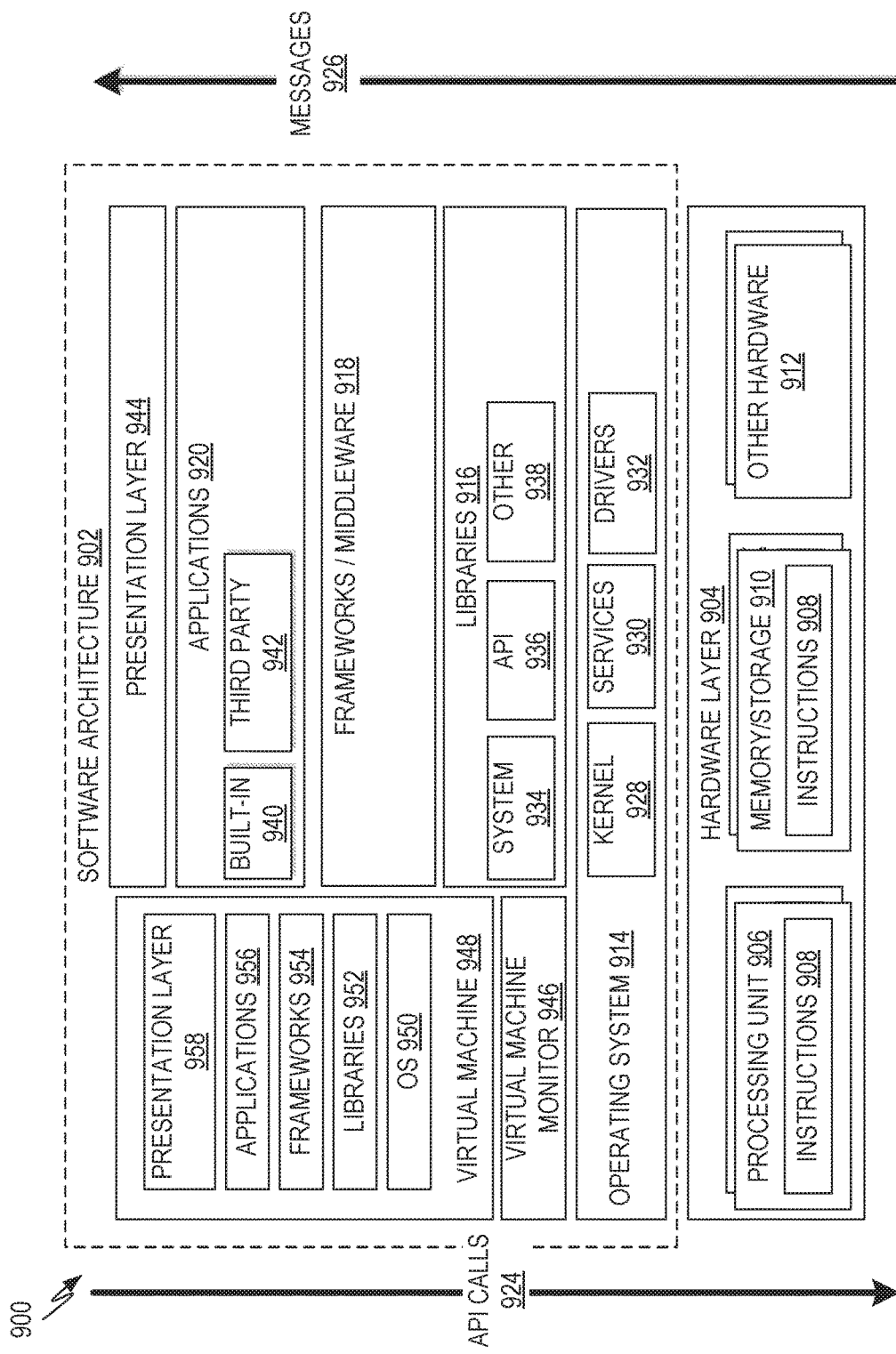
FIG. 9 is a block diagram illustrating a representative software architecture, which may be used in conjunction with various hardware architectures herein described.

FIG. 9 is a block diagram 900 illustrating a representative software architecture 902, which may be used in conjunction with various hardware architectures herein described. FIG. 9 is merely a non-limiting example of a software architecture 902, and it will be appreciated that many other architectures may be implemented to facilitate the functionality described herein. The software architecture 902 may be executing on hardware such as a machine 1000 of FIG. 10 that includes, among other things, processors 1010, memory/storage 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory and/or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and a presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature, and not all software architectures have all layers. For example, some mobile or special purpose operating systems may not provide a frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930, and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third-party application 942 may invoke the API calls 924 provided by the mobile operating system such as the operating system 914 to facilitate functionality described herein.

The applications 920 may utilize built-in operating system functions (e.g., kernel 928, services 930, and/or drivers 932), libraries (e.g., system libraries 934, API libraries 936, and other libraries 938), and frameworks/Middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures utilize virtual machines. In the example of FIG. 9, this is illustrated by a virtual machine 948. A virtual machine creates a software environment where applications/modules can execute as if they were executing on a hardware machine (such as the machine 1000 of FIG. 10, for example). The virtual machine 948 is hosted by a host operating system (operating system 914 in FIG. 9) and typically, although not always, has a virtual machine monitor 946, which manages the operation of the virtual machine 948 as well as the interface with the host operating system (i.e., operating system 914). A software architecture executes within the virtual machine 948, such as an operating system 950, libraries 952, frameworks/middleware 954, applications 956, and/or a presentation layer 958. These layers of software architecture executing within the virtual machine 948 can be the same as corresponding layers previously described or may be different.

Example Machine Architecture and Machine-Readable Medium

Figure 10:
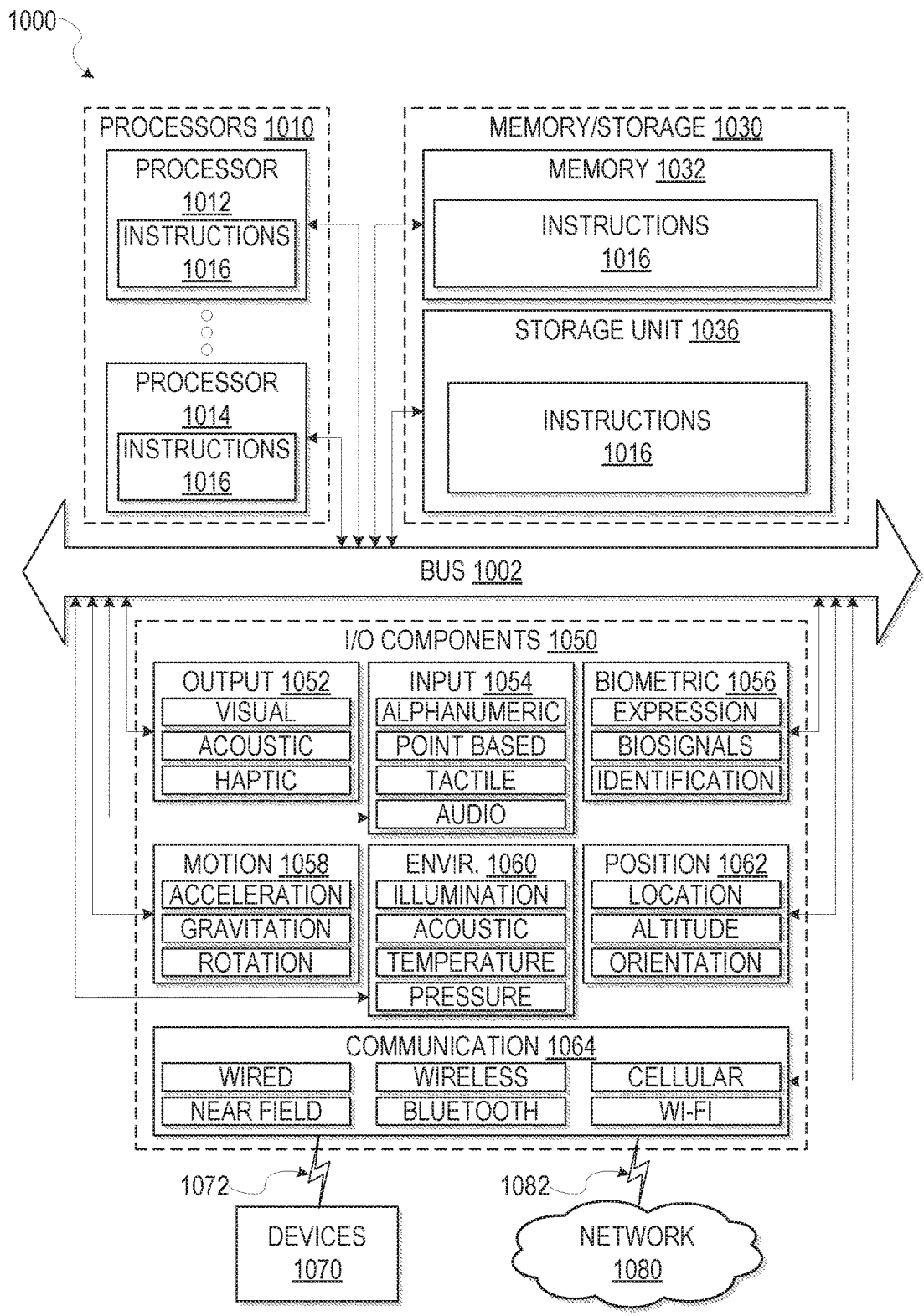
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 1016 from a machine-readable medium (e.g., a machine-readable storage medium) and perform any one or more of the methodologies discussed herein. Specifically, FIG. 10 shows a diagrammatic representation of the machine 1000 in the example form of a computer system, within which the instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the flow diagram of FIGS. 2-3. Additionally, or alternatively, the instructions 1016 may implement modules of FIG. 1, and so forth. The instructions 1016 transform the general, non-programmed machine 1000 into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" may also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1012 and a processor 1014 that may execute the instructions 1016. The term "processor" is intended to include a multi-core processor 1012, 1014 that may comprise two or more independent processors 1012, 1014 (sometimes referred to as "cores") that may execute the instructions 1016 contemporaneously. Although FIG. 10 shows multiple processors 1010, the machine 1000 may include a single processor 1012, 1014 with a single core, a single processor 1012, 1014 with multiple cores (e.g., a multi-core processor 1012, 1014), multiple processors 1012, 1014 with a single core, multiple processors 1012, 1014 with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor 1012, 1014's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store the instructions 1016 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include radio frequency identification (REED) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor;
   a memory; and
   a component stored in the memory and executable by the at least one processor, the component comprising:
      one or more integrators to perform operations comprising:

identifying, in a computer system comprising a plurality of different data sources and a plurality of different applications performing operations on data from the plurality of different data sources, one or more processes that transform data originating in one or more of the plurality of different data sources;

for each of the identified one or more processes, creating a relationship table, the relationship table listing objects input to the process, objects output from the process, and one or more mappings defining transformations performed on the objects input to the process to produce the objects output from the process;

a relationships engine to perform operations comprising:

creating one or more dependencies between relationship tables by linking at least an instance of a first object in input to a process in a first relationship table with at least an instance of the first object in output from a process in a second relationship table; and a big data analytics engine to perform operations comprising:

tracing lineage of an object in the computer system by accessing one or more of the relationship tables and the one or more dependencies between the relationship tables.

2. The system of claim 1, wherein the big data analytics engine is further to perform operations comprising:

calculating a quality score for a data element, the quality score indicating how reliable a data source producing the data element is.

3. The system of claim 1, wherein the big data analytics engine further performs operations comprising generating, in a graphical user interface, a lineage diagram visually indicating the traced lineage of the object in the computer system.

4. The system of claim 3, wherein the lineage diagram indicates an identification of the object in each of a plurality of different applications that transformed the object.

5. The system of claim 1, wherein the different data sources include at least an Enterprise Resource Planning component and an in-memory database.

6. The system of claim 1, wherein each relationship table contains a first column for input objects, a second column for output objects, and a third column for mappings.

7. The system of claim 6, wherein for each row of a relationship table, a mapping in the third column corresponds to a transformation that produces an object in the second column, but does not correlate with the object in the first column.

8. A computerized method comprising:

identifying, in a computer system comprising a plurality of different data sources and a plurality of different applications performing operations on data from the plurality of different data sources, one or more processes that transform data originating in one or more of the plurality of different data sources;

for each of the identified one or more processes, creating a relationship table, the relationship table listing objects input to the process, objects output from the process, and one or more mappings defining transformations performed on the objects input to the process to product the objects output from the process;

creating one or more dependencies between relationship tables by linking at least an instance of a first object in input to a process in a first relationship table with at least an instance of the first object in output from a process in a second relationship table; and tracing lineage of an object in the computer system by accessing one or more of the relationship tables and the one or more dependencies between the relationship tables.

9. The method of claim 8, further comprising calculating a quality score for a data element, the quality score indicating how reliable a data source producing the data element is.

10. The method of claim 8, further comprising generating, in a graphical user interface; a lineage diagram visually indicating the traced lineage of the object in the computer system.

11. The method of claim 10, wherein the lineage diagram indicates an identification of the object in each of a plurality of different applications that transformed the object.

12. The method of claim 8, wherein the different data sources include at least an Enterprise Resource Planning component and an in-memory database.

13. The method of claim 8, wherein each relationship table contains a first column for input objects, a second column for output objects, and a third column for mappings.

14. The method of claim 13, wherein for each row of a relationship table, a mapping in the third column corresponds to a transformation that produces an object in the second column, but does not correlate with the object in the first column.

15. A non-transitory machine-readable storage medium comprising instructions, which when implemented by one or more machines, cause the one or more machines to perform operations comprising:

identifying, in a computer system comprising a plurality of different data sources and a plurality of different applications performing operations on data from the plurality of different data sources, one or more processes that transform data originating in one or more of the plurality of different data sources;

for each of the identified one or more processes creating a relationship table, the relationship table listing objects input to the process, objects output from the process, and one or more mappings defining transformations performed on the objects input to the process to product the objects output from the process;

creating one or more dependencies between relationship tables by linking at least an instance of a first object in input to a process in a first relationship table with at least an instance of the first object in output from a process in a second relationship table; and tracing lineage of an object in the computer system by accessing one or more of the relationship tables and the one or more dependencies between the relationship tables.

16. The non-transitory machine-readable storage medium of claim 15, wherein the operations further comprise calculating a quality score for a data element, the quality score indicating how reliable a data source producing the data element is.

17. The non-transitory machine-readable storage medium of claim 15, wherein the operations further comprise generating, in a graphical user interface, a lineage diagram visually indicating the traced lineage of the object in the computer system.

18. The non-transitory machine-readable storage medium of claim 17, wherein the lineage diagram indicates an identification of the object in each of a plurality of different applications that transformed the object.

19. The non-transitory machine-readable storage medium of claim 15, wherein the different data sources include at least an Enterprise Resource Planning component and an in-memory database.

20. The non-transitory machine-readable storage medium of claim 15, wherein each relationship table contains a first column for input objects, a second column for output objects, and a third column for mappings.

* * * * *